United States Patent [19]

Petticrew

[11] 3,754,881

[45] Aug. 28, 1973

[54] ART OF PRODUCING INORGANIC BODIES HAVING AT LEAST A SURFACE LAYER WHICH IS SEMICRYSTALLINE

[75] Inventor: Richard W. Petticrew, Perrysburg, Ohio

[73] Assignee: Owens-Illinois, Inc., Toledo, Ohio

[22] Filed: Mar. 27, 1969

[21] Appl. No.: 812,960

Related U.S. Application Data

[63] Continuation of Ser. No. 486,191, Sept. 9, 1965, abandoned.

[52] U.S. Cl.................... 65/33, 106/39 DV, 106/52
[51] Int. Cl............................................... C03c 3/22
[58] Field of Search...................... 65/30, 31, 33; 106/39 DV, 52, 54

[56] References Cited

UNITED STATES PATENTS

| | | | |
|---|---|---|---|
| 3,113,009 | 12/1963 | Brown et al. | 65/33 |
| 3,253,975 | 5/1966 | Olcott et al. | 65/33 X |
| 3,272,610 | 9/1966 | Eppler et al. | 65/33 |
| 3,275,492 | 9/1966 | Herbert | 65/33 X |
| 3,300,670 | 1/1967 | Veres | 65/33 X |
| 3,301,649 | 1/1967 | Marusak | 65/30 |

OTHER PUBLICATIONS

McMillan, P. W., "Glass–Ceramics," Academic Press, New York, N.Y., 1964, pp. 121–123, 139–141, 82–83

Primary Examiner—Robert L. Lindsay, Jr.
Attorney—W. A. Schaich and Charles S. Lynch

[57] ABSTRACT

This patent pertains to a method for producing a crystalized glass article in which a glass containing 50.8 percent $SiO_2$, 8.2 percent $Al_2O_3$, 22.5 percent ZnO and 18.5 percent CaO is roughened on an exposed surface such that it has a frosted appearance and thereafter is crystalized on the surface by controlled heating, below the softening temperature to initiate and obtain, crystalization.

1 Claim, No Drawings

ART OF PRODUCING INORGANIC BODIES HAVING AT LEAST A SURFACE LAYER WHICH IS SEMICRYSTALLINE

This application is a continuation of Ser. No. 486,191, filed Sept. 9, 1965, now abandoned.

This invention relates broadly to the art of producing inorganic bodies or articles, e.g., glass bodies or articles, having at least a surface layer which is semicrystalline, i.e., a glass-ceramic layer. The invention is especially directed to a method of making such products.

Glass-ceramics are also sometimes designated as "crystalline" layers or bodies, and by which term is meant layers or bodies that are semicrystalline or at least partly crystalline. The glass-ceramic bodies or surface layers thereof with which this invention is concerned are also sometimes described as "ceramic materials of the kind formed from a heat-sensitive glass by controlled devitrification thereof."

In recent years glass-ceramics including shaped glass-ceramic bodies or structures that are made by the controlled crystallization of "crystallizable" (including potentially crystallizable) glass bodies have come into extensive use for certain purposes, particularly where overall strength and resistance to heat are required, e.g., as "cookware" or, under the broader term, "pressed ware." Some of these glass-ceramics made from particular crystallizable glasses are especially useful as electrically insulating materials (or as components of such materials) where satisfactory electrical properties combined with high mechanical strength are required as in, for instance, high-tension electrical insulation. The same or other glass-ceramics are also particularly valuable as seals (or as components of seals), e.g., vacuum seals, where a sealing material having a particular coefficient of linear thermal expansion is required to match that of a particular metal or alloy in a specific application or use.

In connection with the foregoing see, for example, the the following U.S. Pat. Nos.: 2,933,857 of Apr. 26, 1960; 2,960,801 and -802 of Nov. 22, 1960; 2,998,675 of Sept. 5, 1961; 3,113,009 of Dec. 3, 1963; 3,157,522 of Nov. 17, 1964; 3,161,528 of Dec. 15, 1964; and 3,170,805 of Feb. 23, 1965; also, for additional information on glass-ceramics, their properties and uses, see the article entitled "Glass," *Chemical and Engineering News*, Nov. 16, 1964, pp. 80–96, especially pp. 89, 90 and 96.

The above-cited and other prior art shows that glass-ceramic bodies heretofore have been made by melting and refining a crystallizable glass composition containing a nucleating or crystallization-promoting agent; pressing or shaping the glass composition; annealing the shaped body; and nucleating and crystallizing the annealed body by controlled heat treatment thereof. As a result of such a heat treatment, the glass is converted throughout to a state of finely divided crystals held in dispersed state (usually in a substantially uniformly dispersed state) in a glassy matrix.

U. S. Pat. No. 2,998,675, supra, discloses the controlled heat treatment of a particular $Li_2O/Al_2O_3/SiO_2$ glass composition containing a nucleating agent (crystallization catalyst) whereby there is obtained a glass body with a high modulus of rupture and having on its surface a thin, compressive, semicrystalline layer of the same oxide composition as the glass. The patentees state: "The formation of such semicrystalline surface layer is dependent upon the presence in the glass of a nucleating agent or crystallization-promoting agent."

Illustrative examples of nucleating agents that have been used or suggested for use in making glass-ceramic or semicrystalline bodies and/or surfaces are $TiO_2$, $ZrO_2$, $SnO_2$, $P_2O_5$, $Cr_2O_3$, $ZnO$, $PbO$, $Cu_2O$, gold, platinum and silver introduced into a galss batch in the form of, for instance, gold chloride, platinum chloride and silver nitrate, respectively, as well as others. Usually the nucleating agent(s) constitutes from about 0.1 to about 10 percent by weight of the total glass composition.

The nucleating agent or agents and the amount thereof that are employed are dependent upon such influencing factors as, for example, their cost, other primary components of the glass composition and their ratios to each other, the particular properties desired in the glass-ceramic, and the adverse effect, is any, that a particular nucleating agent may have either on the overall processing technique and/or upon the properties of the final product.

In some cases a particular nucleating agent when used in a particular amount and ratio with respect to certain primary components of a particular crystallizable glass composition may be the cause of, or contribute to, the formation of color or a hazy and undesirable appearance in the finished glass-ceramic structure. Or, the nucleating agent may adversely affect the working properties of the glass composition. If the nucleating agent is essential to the glass composition and its presence is found to be responsible for the formation of, for example, haze and/or color, it may be necessary to modify the overall process to obviate the formation of such haze and/or color. Such modifications usually involve an extra step or steps that add to the cost of the process.

From the foregoing it will be seen that the development of means to avoid the necessity for using a nucleating agent or agents or means to decrease the amount required would simplify the formulations or reduce the cost of glass compositions heretofore commonly required to produce a glass-ceramic body or surface; or would improve the working properties to reduce the color of such a glass-ceramic. It will be further apparent to those skilled in the art that such a development would widen the field of utility of glass compositions previously considered to be unsuitable for use in making glass-ceramic bodies and/or surfaces in the absence of (or in the presence of a reduced amount of) at least one nucleating agent and/or other component(s) that function, for example, as an aid to nucleation or as a modifier of the composition whereby there is provided a crystallizable glass that can be crystallized in situ to yield the glass-ceramic.

The present invention is based on my discovery of simple and economical means hereafter described that obviate the necessity for using nucleating agents in making bodies or articles having at least an exposed surface that is semicrystalline or glass-ceramic in character.

Typical of the prior art is the aforementioned U. S. Pat. No. 2,933,857 which discloses the production of semi-crystalline ceramic bodies by a method of heat treating a particular glass body that is not dependent upon the presence in the glass of a nucleating agent. The glass body comprises, by weight, 85–92 percent $SiO_2$, 6.5–15 percent $Na_2O$ and/or $K_2O$, 0–8 percent $Al_2O_3$ and 0–5 percent F, the total $SiO_2$ plus $Na_2O$ and- /or $K_2O$ amounting to at least 92 percent. The patentee states that more than about 8 percent $Al_2O_3$ prevents satisfactory crystallization of the glass.

The present invention differs from the teachings of the prior art in that it provides a method of reducing the energy required to effect crystal growth in at least a portion of the exposed surface area of a potentially crystallizable glass body which is disinclined to crystallize in situ to form a semicrystalline or glass-ceramic surface when subjected to controlled heat treatment. By "disinclined" it is meant that the potentially crystallizable surface is either non-crystallizable in the absence of the treatment of this invention; or is crystallizable only to a limited extent with the formation of a discontinuous or non-uniform surface layer; or is difficultly crystallizable only under conditions that are uneconomical and/or adversely affect other properties of the glass body.

The method of this invention comprises or includes essentially the step of roughening (including mechanical roughening) at least a portion (i.e., all or some) of the exposed surfaces of the aforementioned potentially crystallizable glass body, e.g., by grinding, sandblasting, shotblasting, etching, "vapor" honing, or by any other suitable means. "Vapor" honing is effected by spraying a slurry of finely divided abrasivre particles such as silica, alumina, silicon carbide, etc., suspended or dispersed in a liquid carrier, e.g., water, upon the glass surface to be roughened.

With further reference to the etching technique that may be the roughening means employed in practicing this invention, this is not to be confused with the optional acid washing of a glass body before being heat treated that is disclosed in the aforementioned U. S. Pat. No. 2,998,675. The patentees, whose invention requires that their glass compositions contain a nucleating agent, express their belief that microscopic cracks in the surface of the glass before it is heat treated may have a weakening effect on the modulus of rupture of the finished article. They then state (col. 4, lines 18–36): "In order to eliminate such cracks and avoid such effect the glass article may, if desired, be acid washed before being heat treated. Acid washing for this purpose is known as fortification and preferably comprises immersing the article for about 10 seconds in a solution composed of equal parts of 70 percent aqueous HF, concentrated $H_2SO_4$ and water; rinsing it in a 5 percent aqueous solution of $HNO_3$; and thereafter rinsing it in water."

In marked contrast the applicant's etching with acid is for an entirely different purpose, namely, to roughen the surface of the glass and thereby establish nucleating centers or sites, while the aforementioned patentees optionally use their described acid treatment to fortify the glass.

Regardless of the roughening means employed in practicing this invention, it may be effected on any part or on all exposed surfaces of the glass body and in any desired pattern. For example, the pattern may be such as to provide surface areas of glass-ceramic material having particular coeefficients of thermal expansion required to effect a satisfactory seal between the glass-ceramic and semiconductors such as silicon, germanium and the like, or conductors such as copper, aluminum, silver and the like. Thus, the present invention provides simple and convenient means for making glass-ceramics, including glass bodies having glass-ceramic or semicrystalline surfaces, that are particularly useful wherever stronger glasses are needed; as a substrate material for a semiconductor; as electron-tube spacers; in making printed circuit boards; and in numerous other applications in the electrical, electronic, missile, airspace and other arts.

The present invention provides a method of introducing nucleating centers that will initiate the growth of crystals in exposed surfaces of a potentially crystallizable glass body or layer thereof that normally crystallizes in situ only when a sufficient amount of an added nucleating agent is present. A required step in the process is the aforementioned roughening of at least some (i.e., all or part) of the exposed surfaces of the potentially crystallizable glass material.

In general, the roughening treatment involved in practicing this invention is such as will provide a frosted (including frosted-like) surface upon clear, uncolored glass that has been subjected to this treatment. When such a surface is obtained light scattering is effected, and the "valleys" and "ridges" that are produced have sharp or relatively sharp angles rather than rounded edges or rounded projections and depressions. Equivalent roughening treatments may be applied to translucent, opaque or colored glasses.

A more specific embodiment of this invention is a method of producing a glass body having a semicrystalline surface, which method comprises essentially or consists essentially in A. roughening at least some of the exposed surfaces of a potentially crystallizable glass which normally can be crystallized in situ only when a sufficient amount of added nucleating agent is present, said glass being free from said agent in said amount; and B. subjecting said glass with its roughened exposed surfaces to a controlled heat treatment effective in forming a semicrystalline portion within its exposed surfaces that were roughened prior to the said treatment.

The controlled heat treatment that is applied to the roughened glass in order to obtain a semicrystalline surface having high modulus of rupture values is above the annealing point of the glass but below its softening point. The time of heat treatment within this range may be varied widely depending, for example, upon the particular glass that is being heat treated and the particular degree of surface crystallization that is desired; but usually is within the range of from 5 minutes to 24 hours or more.

THE POTENTIALLY CRYSTALLIZABLE GLASS

Illustrative examples of potentially crystallizable glass compositions that can be used in practicing this invention are those having coefficients of linear thermal expansion of 25 to 55 × $10^{-7}$ per °C. (0°–300°C.), an annealing point (temperature at which the logarithm of the viscosity is 13.4) of at least 1,050°F., and a composition consisting essentially of the following constituents calculated in weight percent on the oxide basis:

| | |
|---|---|
| $SiO_2$ | 40 – 60 |
| $Al_2O_3$ | 5 – 15 |
| ZnO | 15 – 35 |
| CaO | 0 – 24 |
| BaO | 0 – 20 |
| SrO | 0 – 10 |
| MgO | 0 – 10 |
| $Na_2O$ | 0 – 8 |
| $K_2O$ | 0 – 8 |
| $Li_2O$ | 0 – 2 | wherein the total $Na_2O + K_2O + Li_2O$ is no more than 8 weight percent, the total $CaO + BaO + SrO + MgO$ is within the range of from 6 to 36 weight percent and, when the total $Na_2O + K_2O + Li_2O$ is zero, then the total $CaO + BaO + SrO$ is at least 6 weight percent.

Within the above broad class a more preferred class of glass compositions that can be employed in carrying the present invention into effect embraces those glasses having annealing points at least as high as 1,200°F., contain a total $SiO_2 + Al_2O_3$ content of at least 58 weight percent and have a maximum content of 3 weight percent of total alkali-metal oxides.

Although the above-described potentially crystallizable glasses contain the specified components within the specified ranges, they may also contain other compatible inorganic ingredients in amounts that do not change the novel characteristics of the glass. Thus, the term "consisting essentially of" as used herein and in the appended claims with reference to the above glass compositions, as well as others hereafter described, means that the glasses can optionally contain other compatible inorganic constituents such as, for example, oxides, sulfides and halides of various metals commonly employed as components of glasses to color the glass, to improve its working properties, or for other purposes, so long as a true glass is obtained having the above-described characteristics. Thus, the glasses may contain up to 2 weight percent of MnO, or up to 3 weight percent of colorants such as cobalt oxide, nickel oxide, copper oxides or chromium oxides.

Glasses such as those described above are prepared in the usual manner by melting mixtures of conventional starting materials such as the oxides, carbonates, etc., in either electric or gas-fired furnaces. Melting temperatures within the range of 2,500°–2,900°F. are usually satisfactory. One potentially crystallizable glass is made by melting together the following materials:

| | Parts by Weight |
|---|---|
| Quintus quartz | 254.0 |
| Alundum | 41.0 |
| Zinc oxide | 112.5 |
| Calcium carbonate | 165.2 |

An intimate admixture of the above ingredients in powdered form is melted at 2,700°F. for 19 hours in a gas-fired furnace having 2 percent excess oxygen. The resulting glass composition contains the following oxides in weight percent:

| Glass Composition (A) | Weight Percent |
|---|---|
| $SiO_2$ | 50.8 |
| $Al_2O_3$ | 8.2 |
| ZnO | 22.5 |
| CaO | 18.5 |

Its measured coefficient of linear thermal expansion is about $51 \times 10^{-7}$ per °C. (25°–325°C.), and its annealing temperature is about 1,275°F. Its liquidus is about 2,030°F., and the logarithm of its viscosity at this temperature is about 3.8. Glass composition (A) may be modified to include a small amount, e.g., about 0.5 weight percent of MnO.

In a manner similar to that described above with reference to Glass Composition (A), the following three other glasses are made:

| Glass Composition | Weight Percent | | |
|---|---|---|---|
| | B | C | D |
| $SiO_2$ | 50.8 | 50.8 | 50.8 |
| $Al_2O_3$ | 8.2 | 8.2 | 8.2 |
| ZnO | 31.0 | 31.0 | 31.0 |
| SrO | | 10.0 | |
| CaO | 10.0 | | |
| BaO | | | 10.0 |
| Coefficient of linear thermal expansion per °C.(25°-325°C.), $\times 10^7$ | 42 | 41 | 39 |

Numerous examples of other potentially crystallizable glasses, the constituents of which are within the broad ranges set forth in the first paragraph under the subheading "THE POTENTIALLY CRYSTALLIZABLE GLASS", are given in Table I of my copending application Ser. No. 311,639, filed Sept. 26, 1963, and assigned to the same assignee as the present invention. Such glasses can be roughened and subjected to control heat treatment in accordance with the present invention in order to obtain a glass body having a semicrystalline (i.e., glass-ceramic) surface.

Another class of potentially crystallizable glass compositions that can be used in practicing this invention are those consisting essentially of the following constituents calculated in weight percent on the oxide basis:

| | |
|---|---|
| $SiO_2$ | 45 – 60 |
| ZnO | 15 – 45 |
| $K_2O$ | 0 – 25 |
| $Na_2O$ | 0 – 25 | wherein the total $K_2O + Na_2O$ is at least 10 weight percent but less than 25 weight percent.

Within the scope of the above broad class of glasses set forth in the preceding paragraph, and which may be more broadly described as being zinc silicate glasses, are those glasses consisting essentially of the following constituents calculated in weight percent on the oxide basis:

| | |
|---|---|
| $SiO_2$ | 46 – 51 |
| ZnO | 28 – 37 |
| $Na_2O$ | 2 – 12 |
| $K_2O$ | 5 – 12 |
| CaO | 0 – 3 |
| $Al_2O_3$ | 0 – 4 |
| BaO | 0 – 3 |
| MgO | 0 – 2 |
| $Sb_2O_3$ | 0 – 0.2 |
| MnO | 0 – 0.5 | wherein the total $K_2O + Na_2O$ is at least 10 weight percent but not more than 17 weight percent.

The above glasses are prepared in the usual manner by melting mixtures of conventional starting materials, for instance in essentially the same general manner as has been described hereinbefore under this subheading with reference to zinc aluminum silicate glasses.

More specific examples of zinc silicate glass compositions that can be used in practicing this invention are those containing the following oxides in weight percent:

| Glass | $SiO_2$ | ZnO | $Na_2O$ | $K_2O$ | MnO | $Al_2O_3$ | CaO | MgO | BaO | $Sb_2O_3$ |
|---|---|---|---|---|---|---|---|---|---|---|
| E | 48.0 | 35.0 | 12.0 | 5.0 | 0.5 | | | | | |
| F | 50.5 | 28.8 | 2.0 | 8.0 | 0.5 | 4.0 | 2.75 | 1.2 | 2.75 | |
| G | 46.0 | 37.0 | 7.5 | 7.5 | 0.5 | | | | | 2.0 |
| H | 50.0 | 35.0 | 3.0 | 12.0 | 0.5 | | | | | |

Other examples of zinc silicate glass compositions that can be employed in carrying the instant invention into effect are given in my copending application Ser. No. 486,191, filed Sept. 9, 1965, filed concurrently herewith, assigned to the same assignee as the present invention, and which by this cross-reference is made a part of the disclosure of the present application.

When the molded, cast or otherwise shaped glass body to be surface crystallized in accordance with this invention has, before annealing, sufficient strength and shock resistance to withstand handling and the surface-roughening treatment that is an essential step in this invention, then the etching, "vapor" honing, sandblasting or other roughening means used may be applied to the glass body before it has been annealed. Otherwise the glass body is annealed, and then cooled sufficiently so that it can be handled and roughened.

Roughening the surface of the glass body before annealing has the advantage that only a single heat treatment (i.e., with no intermittent, cooling operation) is necessary. The surface-roughened glass body is merely heated first to its annealing temperature to effect annealing thereof, after which the glass body is subjected to controlled heat treatment above its annealing point but below its softening point.

The annealing-point temperature or range will vary with the particular potentially crystallizable glass composition employed. This temperature can be determined, for example, in accordance with ASTM Designation C 336–54T, the testing apparatus being calibrated using fibers of standard glasses having known annealing and strain points as specified and published by the National Bureau of Standards.

As indicated above, the temperature to which the surface-roughened glass body is heated to effect surface semicrystallization thereof is above its annealing point or range. Thus, in its initial stage the surface-semicrystallization temperature may be of the order of 1,000°–1,200°F. and range upward to a maximum of about 1,900°–2,000°F. or higher depending, for example, upon the particular potentially crystallizable glass composition employed, the kind or degree of surface roughening applied, the physical properties desired in the final product, and other influencing factors. The time of the treatment may be less than 1 minute, e.g., a few seconds, or it may range, for instance, from a few minutes (e.g., 2–5 minutes) to 24 hours or more depending, for example, upon the size of the glass body to be heat treated, the temperature to which it is to be heated, the particular glass composition employed and other influencing factors. This controlled heat treatment may be carried out in a single stage or stepwise.

Taking glasses from the composition areas (a) $Na_2O$-$ZnO$-$SiO_2$, (b) $K_2O$-$ZnO$-$SiO_2$, and (c) $Na_2O$-$K_2O$-$ZnO$-$SiO_2$ as illustrative of glass compositions that are shaped into glass bodies and, usually after annealing, surface roughened in accordance with the invention, such roughened glass surface then can be semicrystallized by heating the glass body from a temperature above its annealing point up to a point under the Littleton softening point (in the viscosity range of from $10^{12}$ to $10^8$ poises) and held at that higher temperature until the desired degree of surface semicrystallization has been obtained. Thus, the period of heating at the said higher temperature may be up to 24 hours or more, for instance for a second or less (especially in the case of small pieces such as 1-inch square glass bodies), or for a period ranging from a few seconds (e.g., 2–5 seconds) to 16–24 hours or more in other cases.

For additional and more detailed information on the temperature conditions required or involved in converting a crystallizable (including potentially crystallizable) glass to a glass-ceramic or semicrystalline state by controlled heat treatment, reference is made to Smith copending application Ser. No. 352,958, filed Mar. 18, 1964, and to Babcock et al. copending application Ser. No. 386,693, filed July 31, 1964, both of which applications are assigned to the same assignee as the present invention.

In order that those skilled in the art may better understand how the present invention can be carried into effect, the following examples are given by way of illustration and not by way of limitation. All parts and percentages are by weight unless otherwise stated.

EXAMPLE 1

Six glass specimens, about 1 inch square and about 0.2 inch thick, are made from a potentially crystallizable zinc aluminum silicate glass (i.e., a glass composition comprised of $ZnO$, $Al_2O_3$ and $SiO_2$) and, more particularly, glass composition A hereinbefore described. These specimens are annealed by heating to a temperature of about 1,275°F., held at that temperature for about 15 minutes and then allowed to cool slowly to ambient temperature (20°–30°C.).

Five of the annealed glass specimens are subjected to various roughening treatments hereafter described while the sixth annealed specimen is used as a control. The roughening treatments employed on individual specimens are as follows:

1. Grinding
2. Sandblasting
3. Shotblasting
4. Vapor honing, and
5. Etching.

Grinding of specimen 1 to roughen it is effected by holding it against a revolving cast-iron wheel over which 400-mesh silicon carbide suspended in water is flowing. Specimens 2 and 3 are sandblasted and shotblasted, respectively, with 400-mesh sand ($SiO_2$) and 400-mesh steel shot, respectively, each carried in a stream of high-velocity air. Specimen 4 is roughened by vapor honing with a spray of a slurry of 400-mesh $Al_2O_3$ suspended in water. (If desired, $Al_2O_3$ may be substituted for SiC as the abradant used in roughening by grinding; and SiC may be substituted for $Al_2O_3$ in roughening by vapor honing.)

A suitable solution for etching the fifth specimen is prepared as follows:

Solution A: This solution is prepared by dissolving 20 g. of an alkali-metal fluoride, specifically potassium fluoride, in 40 cc. of distilled water.

Solution B: This solution is prepared by dissolving 16 g. of an alkali-metal sulfate, specifically potassium sulfate, in 40 cc. of distilled water.

Solutions A and B are mixed together, after which 20 cc. of HCl is added to the mixture to form the etching solution.

The temperature of the bath of etching solution during etching is from 40° to 50°C. A more uniform etch is obtained if the specimen is agitated slightly during the process of etching. The specimen is allowed to remain in the bath for about three minutes, or until the desired degree of etch has been obtained.

In roughening the exposed surfaces of the glass specimens by each of the above-described roughening means, maximum effort is made to obtain a continuous roughened surface, and to secure the frosted-like appearance hereinbefore described. In all cases the extent of roughening is sufficient to remove all of the "as cast" surface of the glass.

After grinding, sandblasting, shotblasting or vapor honing, the glass specimens are individually washed in water to remove all of the abradant, and then dried. The etched glass specimen is removed from the etching bath, washed in water until free of etching bath solution, and dried.

The control glass specimen and the five glass specimens with roughened surfaces are heated to 1,600°F. at the same rate of heating, and are held at 1,600°F. for one hour. They are then cooled over a period of about 4 hours to ambient temperature. Under microscopical examination the control specimen shows the formation of no continuous semicrystalline or glass-ceramic surface layer. In marked contrast, all of the glass specimens that had been surface-roughened before being subjected to the above-described controlled heat treatment are surface-crystallized, forming a continuous semicrystalline layer within the exposed surface areas of each of the specimens where they had been roughened.

The semicrystalline surface layers produced as above described vary in thickness up to about 150 microns with the average thickness being between about 20 and about 100 microns, and probably mostly in the 35/65-micron (e.g., about 50-micron) range.

The continuity of the semicrystalline surface layer that can be produced in accordance with this invention makes the invention particularly useful in improving the uniformity of luminescence, e.g., cathodoluminescence, of glasses having luminescent (including potentially luminescent) surfaces.

Instead of using glass composition A in the foregoing example, one may substitute any of potentially crystallizable glasses B, C or D. The constitution of each of these glass compositions has been given earlier in this specification.

EXAMPLE 2

Same as in Example 1 with the exception that five unannealed (i.e., "as cast") glass specimens are surface-roughened as described in Example 1. These roughened specimens and the control specimen are then heated at the same rate, first to an annealing temperature of about 1,275°F.; held at about 1,275°F. for about 15 minutes; heated further at the same rate to 1,600°F.; held at 1,600°F. for 1 hour; and then cooled over a period of about 4 hours to room temperature. In other words, every effort is made to duplicate in one step the heating conditions employed in two steps in Example 1 and wherein roughening is carried out upon the annealed glass specimens. However, it is not necessary to hold the glass specimen at the annealing temperature for the aforementioned period of about 15 minutes, since substantially the same results are obtained when this holding period is omitted and heating is continued past the annealing temperature to the maximum temperature of about 1,600°F.

The results are essentially the same as when the technique employed in Example 1 is followed. The control specimen, when examined under the microscope, show the formation of no continuous semicrystalline surface layer; while all of the surface-roughened glass specimens show a continuous semicrystalline or glass-ceramic surface layer where the surface had been roughened.

EXAMPLE 3

Same as in Example 1 with the exception that the potentially crystallizable glass has the following approximate composition in parts by weight:

| | |
|---|---|
| $SiO_2$ | 50.8 |
| $Al_2O_3$ | 8.2 |
| ZnO | 22.5 |
| CaO | 18.5 |
| MnO | 0.5 |

In other words, the composition is the same as that employed in Examples 1 and 2 with the exception that it additionally contains 0.5 percent MnO based on the weight of the other four components.

When examined microscopically, the control specimen shows the formation of no continuous semicrystalline surface layer, while all of the other surface-roughened glass specimens have a continuous semicrystalline surface layer.

EXAMPLE 4

Example 1 is repeated with the exception that only the grinding means of roughening is employed, and the following abradants in the stated mesh sizes are used on individual glass specimens:

| abradant | mesh size (U.S. standard sieve series no.) | | | | |
|---|---|---|---|---|---|
| SiC | 30 | 60 | 120 | 240 | 320 |
| $Al_2O_3$ | 30 | 60 | 120 | 240 | 320 |

With both abradants better results are obtained when using 240- or 320-mesh abradant than when the abradant is 30, 60 or 120 mesh. With the 240- and 320-mesh abradants, the results are generally comparable to those obtained with 400-mesh SiC used in Example 1 when roughening by grinding, and with 400-mesh $Al_2O_3$. Hence abradants having a mesh size of at least about 240 are preferred as compared with those that are materially lower in mesh size, e.g., 200 mesh and lower.

In all cases, however, when the control and the roughened specimens are examined microscopically after having been subjected to the controlled heat treatment, it is again noted that the control specimen fails to yield a continuous semicrystalline layer while the other glass bodies yield continuous semicrystalline surface layers where roughening had been effected.

EXAMPLE 5

Same as in Example 1 with the exception that instead of using glass composition A, which is exemplary of a zinc aluminum silicate glass (also sometimes designated as a "zinc-alumino-silicate" glass), there is used a zinc silicate glass, more particularly glass compositions E, F, G and H described earlier in this specification. Similar results are obtained.

In the descriptions in the foregoing examples with reference to the microscopic examinations, reference was made to the fact that in each case the control specimen failed to yield a continuous semicrystalline layer. More particularly it may be stated that the controlled heat treatment of the control specimens resulted either in the formation of only scattered crystals in the surface layer of the glass body or no crystallization whatsoever.

From the foregoing it will be evident that modifications of this invention can be made without departing from the spirit and scope of this disclosure or from the scope of the following claims.

I claim:

1. A method of producing a surface crystallized glass article comprising roughening at least some of the exposed surface of an article formed of a glass consisting essentially of the following constituents calculated in weight percent on the oxide basis:

| | |
|---|---|
| $SiO_2$ | 50.8 |
| $Al_2O_3$ | 8.2 |
| ZnO | 22.5 |
| CaO | 18.5 | said roughening has an appearance equivalent to that of a frosted surface when applied to a clear, transparent, glass and thereafter subjecting said glass within its roughened exposed surface to a controlled heating to a temperature above the annealing temperature of the glass within a temperature range at which nucleation will take place but below the softening temperature of the glass to initiate nucleation and thereafter continued heating to obtain crystallization to thereby form a glass ceramic surface layer in the portion of the exposed surface of the glass that was roughened prior to the heating.

* * * * *